A. S. LYMAN,
Assignor, by mesne assignments, to J. H. BRANIGAN.
Refrigerating Car.
No. 9,659. Reissued April 12, 1881.
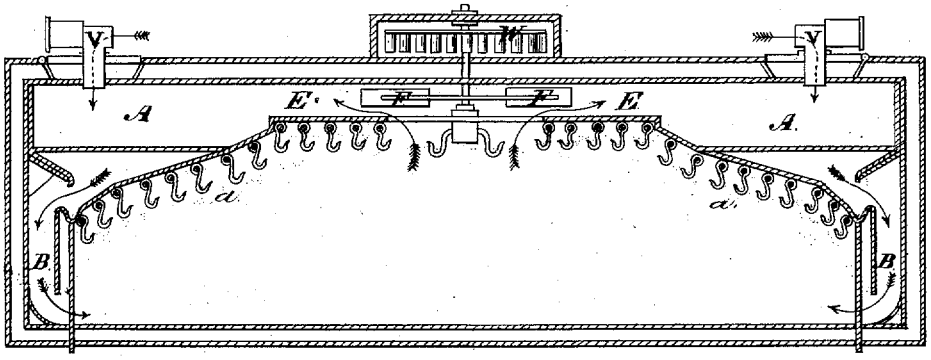
Witnesses:
Henry Eichling
H. Wells Jr
Inventor
Azel S Lyman

UNITED STATES PATENT OFFICE.

AZEL S. LYMAN, OF NEW YORK, ASSIGNOR, BY MESNE ASSIGNMENTS, TO JAMES H. BRANIGAN, OF BROOKLYN, E. D., N. Y.

REFRIGERATING-CAR.

SPECIFICATION forming part of Reissued Letters Patent No. 9,659, dated April 12, 1881.

Original No. 121,530, dated December 5, 1871; antedated November 24, 1871. Application for reissue filed November 27, 1877.

*To all whom it may concern:*

Be it known that I, AZEL STORRS LYMAN, of the city, county, and State of New York, have invented new and useful Improvements in Ventilating and Cooling Refrigerating-Cars; and I do hereby declare that the following is a full, clear, and exact description thereof, reference being had to the accompanying drawing, which shows a vertical longitudinal section, and to the letters of reference marked thereon.

To enable others skilled in the art to make and use my invention, I will proceed to describe its construction and operation.

I build a refrigerator, as, for example, the body of a car, with the top, bottom, and sides made double, and the spaces between them filled with slabs of cork or other bad conductor of heat. In the upper part of each end of the refrigerator I have a reservoir of ice, A, the ice being placed on a grate, and below this grate there being a descending cold or pure air-flue, B. Extending from the upper part of the reservoir of ice A is a flue, E. The extremities of the flues E B most remote from the reservoir of ice A open into the interior of the refrigerator at different parts of the latter.

To insure the requisite circulation of air I provide a fan at the openings or outer ends, hereinbefore referred to, of the flues E. This fan is driven by a wind-wheel, W, attached to its spindle, but outside of the car, and so arranged that when the wind blows, or the car moves rapidly through the external air, the wind-wheel will revolve and drive the fan and insure the circulation of the air in the car, as indicated by the arrows.

For the purpose of ventilating the car with outside air there is provided a receiving-cowl, connecting with each of the reservoirs A. The air, through the motion of the car, is thus forced into the car, circulates in contact with the ice in the ice-box, where it leaves all dust, and passes in contact with the meat pure and cold.

In ventilating and cooling passenger-cars or dwellings the wind-wheel, the fan, and its flues may be dispensed with and the reservoir of cooling material may be much smaller in proportion, and the receiving-cowl many times larger, so that its area shall equal that of the descending-flue.

The meat is suspended from the hooks represented at *a* in the drawing, said hooks being, as shown, so situated that the meat suspended from the said hooks will be subjected to the contact of the cooled and dried air circulated by the action of the fan. Assuming the cowls V to be closed, all the air contained within the refrigerator will be driven, by the fan, outward from the latter into the reservoirs A, thence down through the ice and through the flues B, and thence out, through openings at the lower ends of the latter, into the lower portion of the refrigerator, whence it will be caused to pass inward and upward to the fan, and thus circulated, in its cooled and dried condition, in contact with the meat suspended from the hooks.

By the use of a fan-blower a forced circulation of cold dry air is maintained throughout the car, and the temperature of the bodies to be cooled is reduced to a much lower degree than is possible by what is termed a "natural" or "unaided" circulation, since the blower has a capacity of forcing through the ice any desired quantity of air independent of the natural circulation. By means of air-passages shown the currents of air are forced to travel in longer circuits than would be otherwise the case, which is of great importance where the cooling-chambers are of considerable area.

What I claim as my invention, and desire to secure by Letters Patent, is—

1. The combination of a fan with a reservoir of cooling material connected with the provision-chamber of a refrigerating apparatus, for the purpose of insuring a forced circulation of air from the provision-chamber in contact with the cooling material and back into the provision-chamber, substantially as described.

2. The combination of a fan with a reservoir of cooling material connected with the provision-chamber of a refrigerating apparatus, for the purpose of insuring a forced circulation of air from the provision-chamber in contact with the cooling material and back into the provision-chamber, said provision-chamber being provided with a series of meat-suspending hooks located between the inlet and outlet air-passages, and constructed to suspend the meat in the current of air moving between such passages, substantially as described.

3. A refrigerating apparatus which is provided with a chamber containing cooling material, separated from the provision-chamber by a partition, which partition has an inlet and an outlet opening for the passage of air into and out of the provision-chamber, and a fan for the purpose of forcing the air to circulate from the provision-chamber through the chamber containing cooling material and back into the provision-chamber, substantially as described.

4. In combination with the provision-chamber of a refrigerating apparatus, a chamber containing cooling material, separated from the provision-chamber by a partition, and connected with the provision-chamber by an air duct or flue, which receives the air at a point distant from the chamber containing cooling material, and an outlet-passage into the provision-chamber, and a fan, causing the air passing through the chamber containing cooling material to circulate, substantially as described.

5. In combination with the provision-chamber of a refrigerating apparatus, a chamber containing cooling material, which is separated from the provision-chamber by a partition and is connected to it by an inlet air-passage and by an outlet air duct or flue, which delivers the air at a point distant from the chamber containing cooling material, and a fan, causing the air passing through such chamber containing cooling material to circulate, substantially as described.

6. In combination with the provision-chamber of a refrigerating apparatus, a chamber containing cooling material, which is separated from the provision-chamber by a partition, and is connected to it by two air ducts or flues, which respectively receive and deliver the air, and a fan, causing the air passing through such chamber containing cooling material to circulate, substantially as described.

7. In combination with the provision-chamber of a refrigerating apparatus, a chamber containing cooling material, separated from the provision-chamber by a partition and connected with the provision-chamber by an air duct or flue, which receives the air, and an outlet-passage into the provision-chamber, and a fan, causing the air passing through the chamber containing cooling material to circulate, and a series of meat-suspending hooks, constructed to suspend the meat between the inlet and outlet air-passages, substantially as described.

8. In combination with the provision-chamber of a refrigerating apparatus, a chamber containing cooling material, which is separated from the provision-chamber by a partition, and is connected to it by an inlet air-passage and by an outlet air duct or flue, which delivers the air, and a fan, causing the air passing through such chamber containing cooling material to circulate, and a series of meat-suspending hooks, constructed to suspend the meat between the inlet and outlet air-passages, substantially as described.

9. In combination with the provision-chamber of a refrigerating apparatus, a chamber containing cooling material, which is separated from the provision-chamber by a partition and is connected to it by two air ducts or flues which respectively receive and deliver the air, and a fan, causing the air passing through such chamber containing cooling material to circulate, and a series of meat-suspending hooks, constructed to suspend the meat between the inlet and outlet air-passages, substantially as described.

AZEL S. LYMAN.

Witnesses:

EDWARD HOLLY,
H. WELLS, Jr.